United States Patent

Tuma

[11] Patent Number: 5,220,822
[45] Date of Patent: Jun. 22, 1993

[54] METHOD FOR TESTING VAPOR RECOVERY LINES

[75] Inventor: John E. Tuma, Houston, Tex.

[73] Assignee: Tanknology Corporation International, Houston, Tex.

[21] Appl. No.: 765,434

[22] Filed: Sep. 25, 1991

[51] Int. Cl.⁵ .............................................. G01M 3/26
[52] U.S. Cl. ..................................... 73/40.5 R; 73/40
[58] Field of Search ........................ 73/40.5 R, 40, 46

[56] References Cited

U.S. PATENT DOCUMENTS

| | | |
|---|---|---|
| 2,912,852 | 11/1959 | Trinncer . |
| 2,952,387 | 9/1960 | Fowler et al. . |
| 3,183,723 | 5/1965 | Deters . |
| 3,439,837 | 4/1969 | Hearn et al. . |
| 3,626,760 | 12/1971 | Briggs et al. . |
| 3,692,050 | 9/1972 | Deters . |
| 3,782,168 | 1/1974 | Wailes . |
| 3,793,876 | 2/1974 | Oswald ............................ 73/46 |
| 3,815,327 | 6/1974 | Viland . |
| 3,939,383 | 2/1976 | Alm . |
| 3,982,421 | 9/1976 | Wallace ........................... 73/40 |
| 4,201,081 | 5/1980 | Bonomo . |
| 4,350,038 | 9/1982 | Soncrunt . |
| 4,410,109 | 10/1983 | Murrell . |
| 4,442,702 | 4/1984 | Sawada . |
| 4,474,054 | 10/1984 | Ainlay . |
| 4,534,208 | 8/1985 | Macin et al. ..................... 73/40 X |
| 4,561,291 | 12/1985 | Ainlay . |
| 4,658,986 | 4/1987 | Freed . |
| 4,725,551 | 2/1988 | Thompson . |
| 4,876,530 | 10/1989 | Hill . |
| 4,893,497 | 1/1990 | Danielson . |
| 4,896,528 | 1/1990 | Lewis . |
| 4,899,573 | 2/1990 | Dimmick et al. . |
| 4,979,390 | 12/1990 | Schupack et al. ............... 73/40 X |
| 5,042,290 | 8/1991 | Geisinger ....................... 73/40.5 R |
| 5,048,324 | 9/1991 | Thompson . |
| 5,081,864 | 1/1992 | Zaim . |

OTHER PUBLICATIONS

Brochure, "Tanknology Leak Detector Testing System", 6 pages.
Brochure, "Leak Detector", *Engineering Report*, revised Jan. 1985, 6 pages.
William J. Purpora, "How Technology Has Changed in Precison Volumetric Line Testing", 5 (1) Tank Talk 2 (Jan. 1990).
Brochure, "Horner EZY3 Tank Tightness Tester", 2 pages.
Brochure, "LDT-880 Leak Detector Testing System", 2 pages.
Brochure, "Operating Instructions for LDT880", revised Apr. 24, 1989, 4 pages.

*Primary Examiner*—Tom Noland
*Assistant Examiner*—Joseph W. Roskos
*Attorney, Agent, or Firm*—Vanden, Eickenroht, Thompson, Boulware & Feather

[57] ABSTRACT

A method for testing vapor recovery units having phase II capabilities for integrity, blockage, or both is disclosed. The vapor recovery unit is modified for vacuum testing. To test the integrity of the unit, a vacuum is drawn in the unit to a predetermined level whereupon it is monitored for decay over a predetermined period of time to ascertain whether the unit is leaking. To test for blockage, a vacuum is continuously drawn in the unit while the lines associated with the phase II capabilities are disconnected from the dispensing station at the point most proximal to the station. Flow of fluid induced by the vacuum is then measured and compared to the desired rate of flow to ascertain the extent of blockage, if any.

19 Claims, 5 Drawing Sheets

METHOD FOR TESTING VAPOR RECOVERY LINES

BACKGROUND OF THE INVENTION

1. Field of the Invention

This invention pertains to testing the integrity and operation of vapor recovery units for gasoline dispensing pumps. More specifically, this invention pertains to testing vapor recovery units having phase II vapor recovery capability.

2. Description of the Prior Art

The adverse effects of vapors generated by refined petroleum products such as gasoline have been known for many years. These vapors are largely comprised of benzene, which is causally linked to increased incidences of human cancer. These vapors are also major contributors to the deterioration of the earth's ozone layer which has become a major ecological concern. Vapor recapture has therefore become very socially and ecologically desirable.

Vapor recapture is also economically desirable. For many years underground storage reservoirs at gasoline service stations have been equipped with vapor recovery units. These units are risers running upward from the reservoir where the vapors rise and condense to fall back into the reservoir. These units are also vented to the ambient atmosphere for safety reasons. This is the first generation of vapor recovery and is referred to as "phase I" vapor recovery.

Vapors also escape when a consumer fills the tank of an automobile from the gasoline dispensing station at the service station. When the nozzle is placed in the tank and gasoline is pumped, vapors escape because nozzles are generally much smaller in diameter than most tank openings. This source of vapor has recently been targeted by the addition of a second generation of vapor recovery capabilities called "phase II" vapor recovery.

The addition of "phase II" capabilities to vapor recovery units has created some confusing terminology with respect to vapor recovery units. The first generation units are often equipped with phase II capabilities and are invariably then referred to as "phase II recovery units" even though they have both phase I and II capabilities. Vapor recovery units that are not equipped with phase II capabilities are referred to as "phase I vapor recovery units". The terminology therefore does not accurately describe the types of units. The term "vapor recovery unit" will be used in its more generic sense herein with separate reference to phase I and phase II capabilities.

Phase II capabilities of vapor recovery units are achieved using much the same principles as are phase I capabilities. A boot extends over the juncture of the nozzle and tank opening to seal the juncture from the atmosphere. The boot is connected by a hose, or "line", to the riser of the vapor recovery unit. Vapors escaping at the nozzle-tank juncture collect in the boot, condense in the line, and are drained to the underground reservoir via the riser.

California, Florida, and New Jersey already mandate phase II capabilities in the vapor recovery units that every service station in those states is required to employ. The federal government of the United States will soon mandate phase II capabilities for all service stations nationwide. The need for testing vapor recovery units, especially those with phase II capabilities, that developed from state regulation will greatly increase when the new federal regulations are implemented.

There are two types of problems that commonly occur in vapor recovery units having phase II capabilities. First, the associated lines develop leaks that are undetectable by human observation for a variety of reasons. Second, the associated lines become blocked, thereby decreasing the efficiency and safety of the vapor recovery unit. The above-mentioned need therefore manifests itself in two ways: a need to test phase II lines for leaks and a need to test phase II lines for blockages.

It is therefore a feature of this invention that it provides a method for testing phase II lines of vapor recovery units for leaks.

It is also therefore a feature of this invention that it provides a method for testing phase II lines of vapor recovery units for blockages.

It is a further feature of this invention that it provides a method for testing phase II lines for both leaks and blockages.

It is a still further feature of this invention that the method and the equipment used to practice it are capable of testing within the limits soon to be imposed by federal regulations.

It is also a feature of this invention that the equipment for performing this method is compact and portable so that the method can be practiced at a variety of sites using the same equipment.

SUMMARY OF THE INVENTION

The invention is a method for testing vapor recovery units having phase II capabilities for integrity, blockage, or both. The vapor recovery unit is modified for vacuum testing. To test the integrity of the unit, a vacuum is drawn in the unit to a predetermined level whereupon it is monitored for decay over a predetermined period of time to ascertain whether the unit is leaking. To test for blockage, a vacuum is continuously drawn in the unit while the lines associated with the phase II capabilities are disconnected from the dispensing station at the point most proximal to the station. Flow of fluid induced by the vacuum is then measured and compared to the desired rate of flow to ascertain the extent of blockage, if any.

BRIEF DESCRIPTION OF THE DRAWINGS

A more particular description of the invention briefly summarized above may be had by reference to the exemplary preferred embodiment illustrated in the drawings of this specification so that the manner in which the above cited features, as well as others which will become apparent, are obtained and can be understood in detail. The drawings nevertheless illustrate only a typical, preferred embodiment of the invention and are not to be considered limiting of its scope as the invention may admit to other equally effective embodiments.

In the Drawings.

DESCRIPTION OF THE PREFERRED EMBODIMENT

Figure 1:
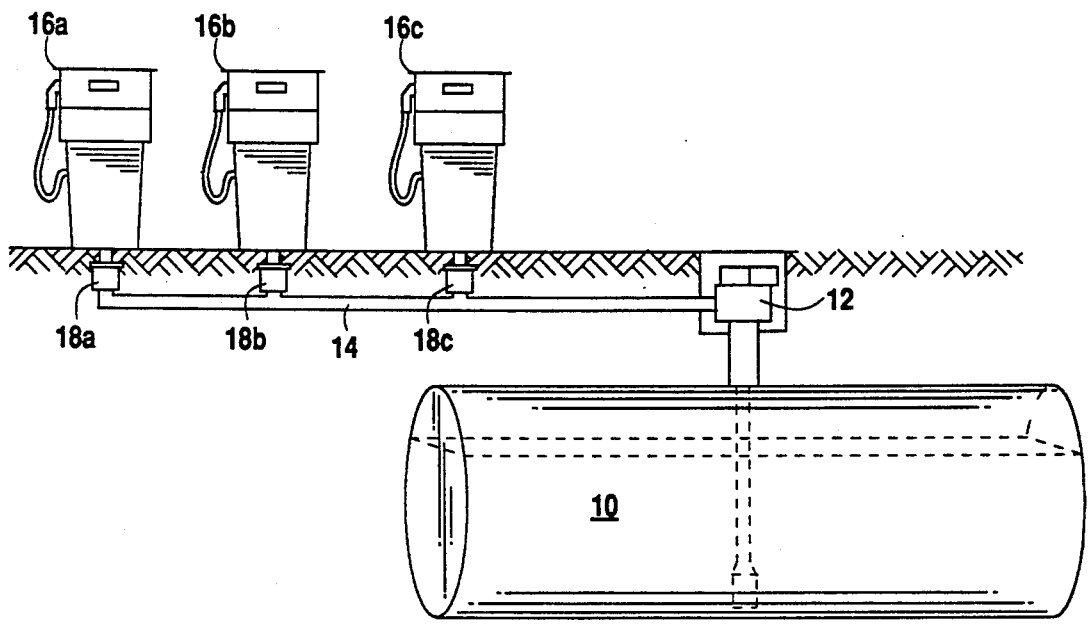
FIG. 1 illustrates the relationship of dispensing stations and the underground reservoir of a gasoline service station minus the vapor recovery unit.
Figure 2:
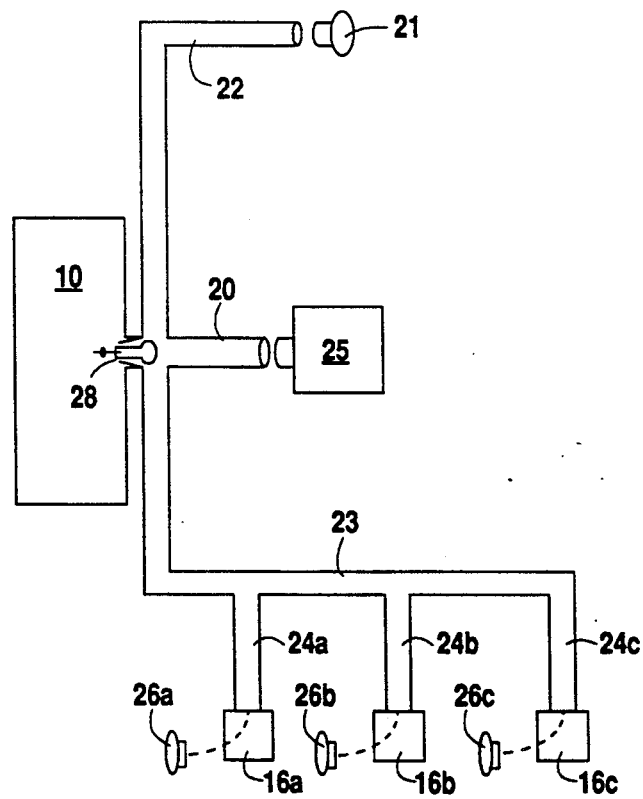
FIG. 2 is a functional diagram of a vapor recovery unit having phase II capabilities and its relationship to the dispensing system of FIG. 1.

FIG. 1 illustrates the relationship of underground reservoir 10 to dispensing stations 16a–c. In operation, dispensing pump 12 pumps gasoline from reservoir 10 to dispensing stations 16a–c via underground line 10 and impact valves 18a–c. FIG. 2 diagrammatically illustrates the relationship of a vapor recovery unit having phase II capabilities with the dispensing system of FIG. 1. The vapor recovery unit comprises riser 20, vent 22, and phase II recovery lines 23 and 24a–c. Lines 24a–c are dedicated to dispensing stations 16a–c, respectively, and drain into reservoir 10 via line 23 and ball float 28.

The first step in testing the vapor recovery unit is to modify the unit for vacuum testing. This primarily involves sealing vent 22 from the ambient atmosphere, riser 20 from reservoir 10, and lines 24a–c from dispensing stations 16a–c. Vent 22 is sealed by removing the vent cap (not shown) and replacing it with pack-off or pipe plug 21. Riser 20 is sealed from reservoir 10 by the replacing ball float with an OPW ball float, a test plug, or some other suitable plug known to the art such as ball float 28. Lines 24a–c are disconnected from dispensing stations 15a–c at the point most proximal to dispensing stations 16a–c and sealed with a 1¼" plug or some other suitable plug, such as plugs 26a–c, known to the art. The point most proximal the station is typically the point at which the line meets the boot. The above steps may be performed in any order.

Modifying the vapor recovery unit for vacuum testing also requires installing means for drawing a vacuum, generally denoted as 25, in the vapor recovery unit including all equipment necessary for the test. Vacuum drawing means 25 shown in FIG. 2 is illustrated in greater detail in FIG. 3 in its preferred embodiment. Vacuum drawing means 25 in FIG. 3 is designed for testing the vapor recovery unit for both leaks and blockages and therefore not all elements are necessary for all tests.

Vacuum drawing means 25 nevertheless requires vacuum pump 30 for both types of testing. Vacuum pump 30 in the preferred embodiment is a Gast Equivalent No. 0522-V103-G18DX rotary vane, oilless, ¼ Hp-115V vacuum pump obtained from Grainger, Inc. (Part No. 4Z335). Filtering and valving means associated with the exhaust and intake of vacuum pump 30 are not shown as they are well known to those of ordinary skill in the art. Vacuum drawing means 25 also requires some means for sealing the end of riser 20 most distal to reservoir 10 (in FIGS. 1–2) that will maintain a sealed fluid connection between the contents of riser 20 and vacuum pump 30. This sealing means in FIG. 3 is pack-off 36 having passage 37 therethrough sealably fitted into the end of riser 20 and the associated valving and hoses.

Figure 3:
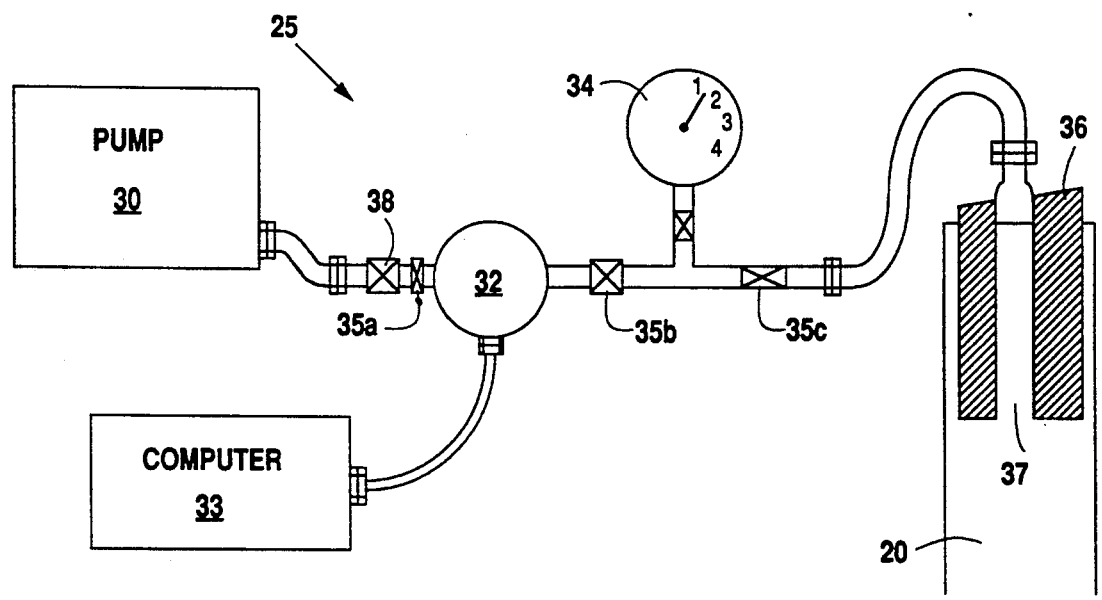
FIG. 3 illustrates the apparatus used to practice the method of the invention.
Figure 4:
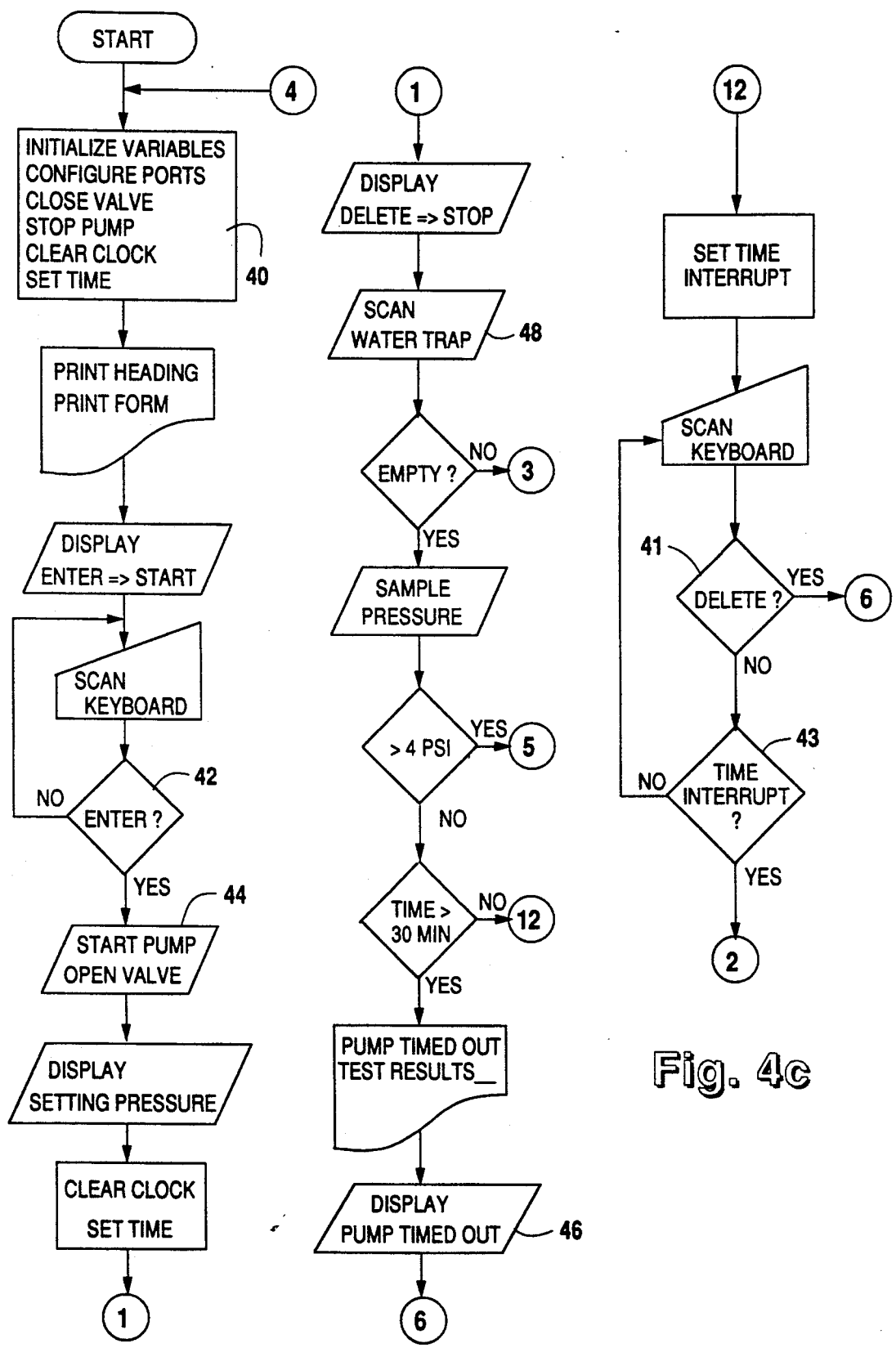
FIGS. 4a–4c and 5–6 are the flow charts of the method of the invention as embodied in the software of the computing means of the apparatus shown in FIG. 3.
Figure 5:
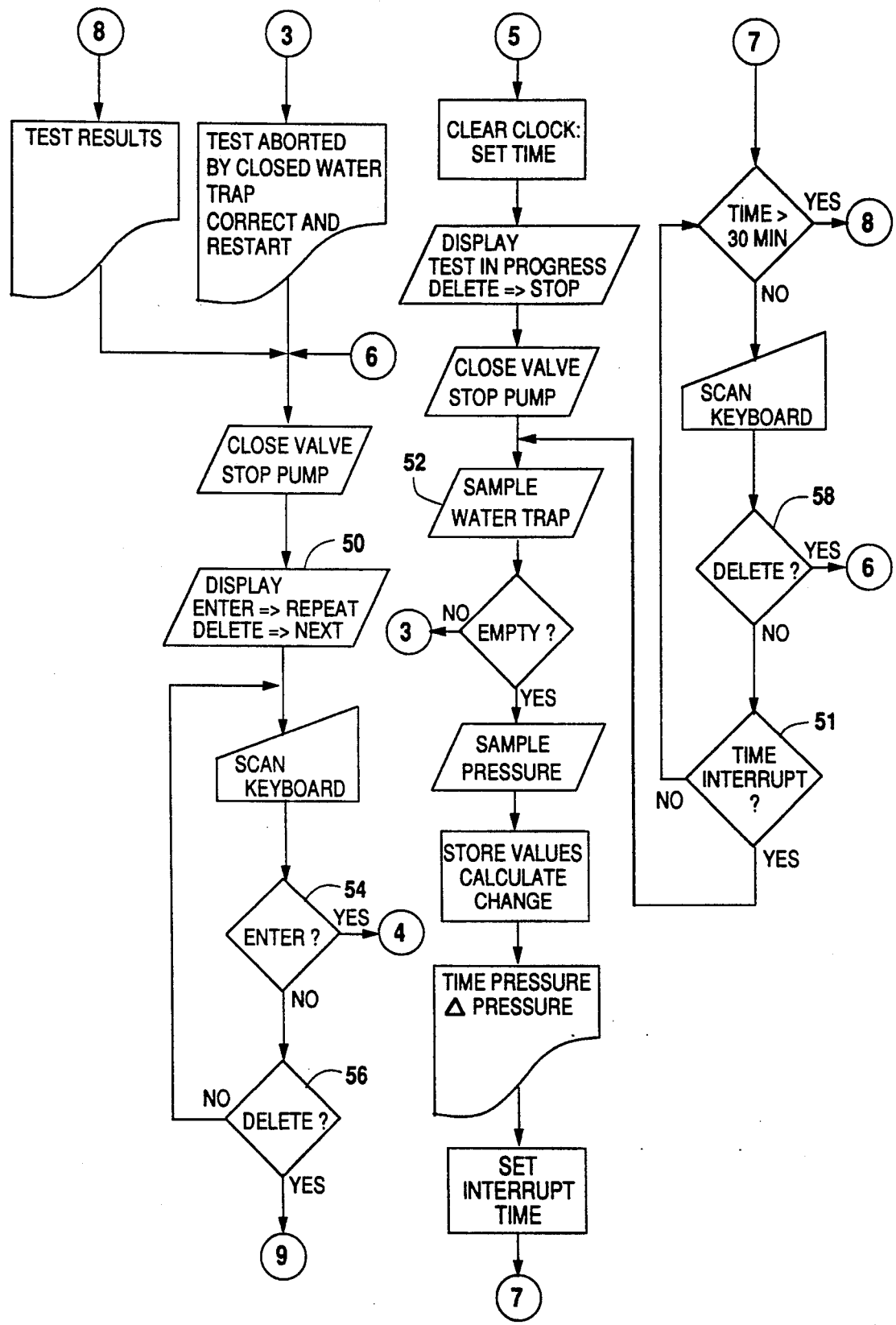
Figure 6:
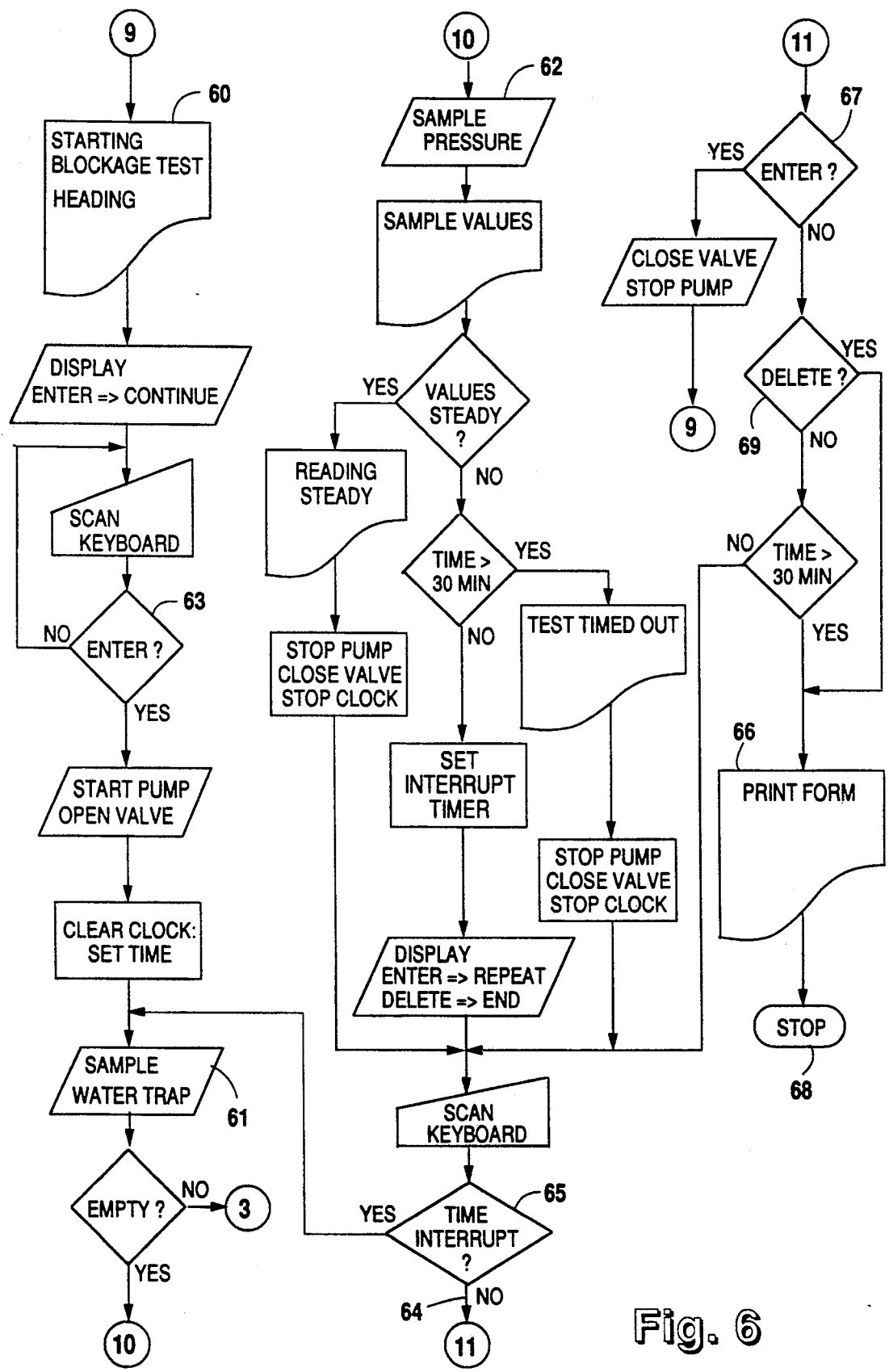

Still discussing vacuum drawing means 25 as illustrated in FIG. 3, flow meter 32, vacuum gauge 34, and relief valve 38 are used depending on whether testing for leaks or blockage. Valves 35a–c are one-way vacuum check valves such as Gast vacuum check valve Model No. AE238 obtainable from Southwestern Controls 34 can be a 30" Hg gauge, U.S. Gauge Model No. V500-30CBM obtainable from Grainger, Inc. (Part No. 1A318). Computing means 33 automates the testing procedures but is not strictly necessary for the practice of the invention. The flow chart illustrating the automated testing procedure performed by computing means 33 is found in FIGS. 4–6, and disclosed below.

Computing means 33 is disclosed and discussed in copending application for patent Serial Number 07/654,939 filed Feb. 13, 1991 commonly assigned herewith. Computing means 33, in pertinent part, comprises an on/off switch, a reset button, a 16-key 4×4 matrix keypad, an LCD display having two lines of twenty columns, and a standard 40 column dot-matrix printer housed in formed aluminum case manufactured for housing instrumentation. Computing means 33 is powered by a 12V dc gell-cell battery that can recharged from any automobile battery while the automobile is idling.

The software is stored in a 64 Kbit EPROM and run on an 8-bit microprocessor. The microprocessor is an 8052AH processor produced by Intel Corporation. The automated testing is performed by the software on data entered with the keypad and with data received from electrical transducers using conventional data acquisition and A/D conversion techniques.

After modifying the vapor recovery unit for vacuum testing, procedure varies depending on whether only one is testing for integrity (i.e., leakage) or blockage. The invention performs both types of testing, but sequentially so that only one type is performed at any given time during testing. Performing one type of testing does not necessitate performing the other but the preferred embodiment will typically run both tests on each service call. It also does not matter which type is performed first since the step of modifying the vapor recovery unit is common and is identical in both tests.

In testing for integrity, a vacuum is drawn in the modified vapor recovery unit with vacuum pump 30 (FIG. 3) until the vacuum reaches a predetermined level whereupon relief valve 38 releases. In the preferred embodiment the predetermined level is −4.0 psi because the pipe is generally rated for approximately 5.0 psi. Other levels, however, may be equally suitable. Valve 35a is then closed to maintain the vacuum in the vapor recovery unit and vacuum pump 30 is turned off. The level of the vacuum can be monitored visually via vacuum gauge 34 or automatically via computing means 33 and is monitored for a preselected period of time (30 minutes in the preferred embodiment). If the vacuum level remains relatively constant, then there are no leaks. Although significant vacuum decay indicates one or more leaks, insignificant decline in the vacuum is to be expected and discounted as no vapor recovery unit will be absolutely airtight. Detected leaks can then be located using Helium as is well known in the art.

Blockage testing requires that a vacuum be continuously drawn using vacuum pump 30. Assuming that integrity testing is performed immediately prior, valve 35a must be reopened and vacuum pump 30 turned on again. Lines 24a–c are sequentially opened and closed one at a time, the flow of fluid through them measured, and the measured flow compared to the theoretical flow to determine whether and to what extent blockage exists in the lines of the vapor recovery unit. The fluid is most conveniently ambient atmosphere but other non-contaminating fluids such as gasoline of an equivalent type may be used.

The theoretical flow is determined from the line diameter and line length using well known mathematical formulas. For instance, if line 24a is fifty feet (50') long and two inches (2") in diameter, a vacuum in the vapor recovery unit should induce a flow through the opening exerting a pressure of approximately 1.60-1.65 psi. Since the vapor recovery unit is sealed, any flow detected by flow meter 32 will result from the opening at line 24a. If a complete blockage exists, the vacuum measured by vacuum gauge 34 will increase up to −3.0 psi or more. Computing means 33 automatically shuts off vacuum pump 30 in the preferred embodiment if the vacuum exceeds −4.0 psi for safety reasons in the preferred embodiment. The calculation is performed in the preferred embodiment for each of lines 24a-c, respectively, them. Once each of lines 24a-c is tested, the procedure is repeated for vent 22.

The method of invention as embodied in the software of computing means 33 of the preferred embodiment is illustrated in FIGS. 4a-4c and 5-6. Computing means 33 begins by setting, and conditioning the equipment at point 40 in FIG. 4a and waits until the operator presses the carriage return at point 42. Integrity testing then begins at point 44 and ends at point 46. Computing means 33 then waits for instruction or whether to repeat integrity testing or to proceed to blockage testing at point 50 in FIG. 5. Blockage testing begins at point 60 in FIG. 6. Data acquisition and processing after vacuum is drawn begins at point 62 and continues through approximately point 64. Output from both integrity and blockage testing occurs at point 66 of the process and all testing ends at point 68.

The water trap of the vapor recovery unit (not shown) is checked several times for obstruction (i.e., at points 48, 52, and 61). This is not strictly necessary for the practice of the invention but is performed in the preferred embodiment of the invention because of its effect on testing. Also, many of the queries found in FIGS 4a-4c, and 5-6 (i.e., points 42, 41, 43, 54, 56, 51, 58, 63, 65, 67, and 69) and some associated steps are necessitated by the automated nature of the preferred embodiment and are not strictly necessary if the invention is practiced manually as will be obvious to those having skill in the art.

Greater than expected vacuums and lesser than expected flows indicate whether and to what extent blockages exist. By opening and closing lines 24a-c and vent 22 the source of flow is isolated and controlled so that the point at which blockage, if any, exists can be located. For instance, if blockage is detected when testing line 24c but not lines 24a-b, then blockage exists either in line 23 between lines 24b and 24c or in line 24c itself. Similarly, if blockage is detected in vent 22 but not in any of lines 24a-c then blockage exists somewhere in vent 22 up to riser 20, but not in riser 20. Once testing is completed, the vapor recovery unit is returned to service by reversing the vacuum testing modification in the preferred embodiment.

The preferred embodiment disclosed herein is, however, to be considered illustrative only as the invention may be modified and practiced in different but equivalent manners apparent to those skilled in the art who have the benefit of the teachings herein. For instance, in addition to the blockage testing described above, riser 20 can be checked for the presence of liquid beneath packoff 36 after each of 24a-c and vent 22 are checked. The presence of liquid in riser 20 is another indicator of blockage. Further, not all of lines 24a-c and vent 22 need be checked, but superior test results are achieved when all lines are tested. It is therefore evident that the preferred embodiment can be altered or modified and that such variations are to be considered within the scope and spirit of the invention.

What is claimed is:

1. A method for testing the integrity of the vapor recovery unit of a gasoline station dispensing station where the vapor recovery unit has phase II capability, comprising the steps of:

sealing the vapor recovery unit from the dispensing station at the point most proximal to the dispensing station;

sealing the vapor recovery unit from the gasoline reservoir;

installing means for drawing a vacuum in the riser of the vapor recovery unit;

sealing the vent of the vapor recovery unit;

drawing a vacuum in the sealed vapor recovery unit until the vacuum reaches a predetermined level; and monitoring the vacuum pressure relative to the predetermined level in the modified vapor recovery unit for a preselected period of time to determine whether the vapor recovery unit is leaking.

2. The method of claim 1, wherein the vacuum drawing means comprises:

a vacuum pump;

mean for sealing the riser having a fluid passage therethrough;

a vacuum gauge fluidly connected to the passage of said sealing means;

a flow meter fluidly connected to said vacuum gauge; and a relief valve fluidly connected to said flow meter and to said vacuum pump.

3. A method for testing the integrity of the vapor recovery unit of a gasoline station dispensing station where the vapor recovery unit has phase II capability, comprising the steps of:

modifying the vapor recovery unit for vacuum testing;

drawing a vacuum in the modified vapor recovery unit until the vacuum reaches a predetermined level;

monitoring the pressure exerted by the vacuum in the modified vapor recovery unit for a preselected period of time to determine whether the vapor recovery unit is leaking:

continuously drawing a vacuum in the modified vapor recovery unit after determining whether the vapor recovery unit is leaking;

calculating the desired rate of flow of a fluid through the vapor recovery unit at the point most proximal to the dispensing station;

opening the modified vapor recovery unit at the point most proximal to the dispensing station while the vacuum is being drawn;

monitoring the actual rate of flow of the fluid induced by the vacuum while the modified vapor recovery unit is opened; and comparing the actual rate of flow with the calculated desired rate of flow to determine if flow is impaired.

4. The method of claim 3, including the step of monitoring the presence of fluid in the riser of the vapor recovery unit after determining whether flow is impaired.

5. The method of claim 3, wherein the step of modifying the vapor recovery unit comprises the steps of:

sealing the vapor recovery unit from the dispensing station at the point most proximal to the dispensing station;

sealing the vapor recovery unit from the gasoline reservoir;

installing means for drawing a vacuum in the riser of the vapor recovery unit; and sealing the vent of the vapor recovery unit.

6. The method of claim 5, wherein the vacuum drawing means comprises:

a vacuum pump;

means for sealing the riser having a fluid passage therethrough;

a vacuum gauge fluidly connected to the passage of said sealing means;

a flow meter fluidly connected to said vacuum gauge; and a relief valve fluidly connected to said flow meter and to said vacuum pump.

7. A method for testing the operation of the vapor recovery unit of a gasoline station dispensing station where the vapor recovery unit has phase II capability, comprising the steps of:

modifying the vapor recovery unit for vacuum testing;

continuously drawing a vacuum in the modified vapor recovery unit;

calculating the desired rate of flow through the vapor recovery unit at the point most proximal to the dispensing station;

opening the modified vapor recovery unit at the point most proximal to the dispensing station;

monitoring the actual rate of flow of a fluid induced by the vacuum while the modified vapor recovery unit is opened; and comparing the actual rate of flow with the calculated rate of flow to determine if flow is impaired.

8. The method of claim 7, including the step of monitoring the presence of fluid in the riser of the vapor recovery unit after determining whether flow is impaired.

9. The method of claim 7, wherein the step of modifying the vapor recovery unit comprises the steps of:

sealing the vapor recovery unit from the dispensing station at the point most proximal to the dispensing station;

sealing the vapor recovery unit from the gasoline reservoir;

installing means for drawing a vacuum in the riser of the vapor recovery unit; and sealing the vent of the vapor recovery unit.

10. The method of claim 9, wherein the vacuum drawing means comprises:

a vacuum pump;

means for sealing the riser having a fluid passage therethrough;

a vacuum gauge fluidly connected to the passage of said sealing means;

a flow meter fluidly connected to said vacuum gauge; and a relief valve fluidly connected to said flow meter and to said vacuum pump.

11. The method of claim 7, including the steps of:

closing the opened modified vapor recovery unit after determining whether flow is impaired;

drawing a vacuum in the modified vapor recovery unit until the vacuum reaches a predetermined level; and monitoring the vacuum in the vapor recovery unit for a preselected period of time to determine whether the vapor recovery unit is leaking.

12. The method of claim 11, wherein the step of modifying the vapor recovery unit comprises the steps of:

sealing the vapor recovery unit from the dispensing station at the point most proximal to the dispensing station;

sealing the vapor recovery unit from the gasoline reservoir;

installing means for drawing a vacuum in the riser of the vapor recovery unit; and sealing the vent of the vapor recovery unit.

13. The method of claim 12, wherein the vacuum drawing means comprises:

a vacuum pump;

means for sealing the riser having a fluid passage therethrough;

a vacuum gauge fluidly connected to the passage of said sealing means;

a flow meter fluidly connected to said vacuum gauge; and a relief valve fluidly connected to said flow meter and to said vacuum pump.

14. The method of claim 11, including the step of monitoring the presence of fluid in the riser of the vapor recovery unit after determining whether flow is impaired.

15. A method for testing a vapor recovery unit of a gasoline station dispensing station where the vapor recovery unit has phase II capability, comprising the steps of:

modifying the vapor recovery unit for vacuum testing;

drawing a vacuum in the modified vapor recovery unit until the vacuum reaches a predetermined level;

monitoring the pressure exerted by the vacuum in the modified vapor recovery unit for a preselected period of time to determine whether the vapor recovery unit is leaking;

continuously drawing a vacuum in the modified vapor recovery unit after determining whether the vapor recovery unit is leaking;

calculating the desired rate of fluid flow through the modified vapor recovery unit at the point most proximal to the dispensing station;

opening the modified vapor recovery unit at the point most proximal to the dispensing station;

monitoring the actual rate of flow of the fluid induced by the vacuum;

comparing the actual rate of flow with the calculated rate of flow to determine if flow is impaired; and monitoring the presence of fluid in the riser of the modified vapor recovery unit after determining whether flow is impaired.

16. The method of claim 15, wherein the step of modifying the vapor recovery unit comprises the steps of:

sealing the vapor recovery unit from the dispensing station at the point most proximal to the dispensing station;

sealing the vapor recovery unit from the gasoline reservoir;

installing means for drawing a vacuum in the riser of the vapor recovery unit; and sealing the vent of the vapor recovery unit.

17. The method of claim 16, wherein the vacuum drawing means comprises:

a vacuum pump;

means for sealing the riser having a fluid passage therethrough;

a vacuum gauge fluidly connected to the passage of said sealing means;

a flow meter fluidly connected to said vacuum gauge; and a relief valve fluidly connected to said flow meter and to said vacuum pump.

18. A method for testing the integrity and operation of the vapor recovery unit of a gasoline station dispensing pump where the vapor recovery unit has phase II capability, comprising the steps of:

modifying the vapor recovery unit for vacuum testing, including sealing the vapor recovery unit from the dispensing station at the point most proximal to the dispensing station, sealing the vapor recovery unit from the gasoline reservoir, installing means for drawing a vacuum in the riser of the vapor recovery unit, the means comprising a vacuum pump, means for sealing the riser having a fluid passage therethrough, a vacuum gauge fluidly connected to the passage of the sealing means, a flow meter fluidly connected to the vacuum gauge, and a relief valve fluidly connected to the flow meter and to the vacuum pump, and sealing the vent of the vapor recovery unit;

drawing a vacuum in the modified vapor recovery unit until the vacuum reaches a predetermined level;

monitoring the pressure exerted by the vacuum in the modified vapor recovery unit for a preselected period of time to determine whether the vapor recovery unit is leaking;

continuously drawing a vacuum in the modified vapor recovery unit after determining whether the vapor recovery unit is leaking;

calculating the desired rate of flow through the vapor recovery unit at the point most proximal to the dispensing station;

opening the modified vapor recovery unit at the point most proximal to the dispensing station;

monitoring the actual rate of flow of a fluid induced by the vacuum at the point most proximal to the dispensing station;

comparing the actual rate of flow with the calculated rate of flow to determine if flow is impaired; and monitoring the presence of fluid in the riser of the vapor recovery unit after determining whether flow is impaired.

19. A kit for testing vapor recovery units having phase II capabilities, the vapor recovery unit comprising a riser having a first end proximal to a reservoir in which a ball float is installed and a second end distal to the reservoir, a vent from the reservoir to the ambient atmosphere, and a line from the reservoir to a dispensing station, the kit comprising:

means for sealing the vent from the ambient atmosphere, said vent sealing means being formed to be sealably inserted into the vent at the point most distal to the reservoir;

means for sealing the line from the dispensing station, said line sealing means being formed to be sealably inserted into the line at the point most distal from the reservoir;

means for sealing the proximal end of the riser from the reservoir, said riser sealing means replacing the ball float and being formed to be sealably inserted into the proximal end of the riser; and means for drawing and monitoring a vacuum in the reservoir, said vacuum means being shaped in part to be sealably inserted into the distal end of the riser while remaining in fluid communication with the vapor recovery unit.

* * * * *